Nov. 18, 1941. E. B. MALOON Re. 21,947

CARRY TYPE SCRAPER

Original Filed Feb. 6, 1937 2 Sheets-Sheet 1

Inventor
Earl B. Maloon,
By Webster & Webster
Attorney

Nov. 18, 1941. E. B. MALOON Re. 21,947

CARRY TYPE SCRAPER

Original Filed Feb. 6, 1937 2 Sheets-Sheet 2

Inventor
Earl B. Maloon,
By Webster & Webster
Attorney

Reissued Nov. 18, 1941

Re. 21,947

UNITED STATES PATENT OFFICE 21,947

CARRY TYPE SCRAPER

Earl B. Maloon, South Pasadena, Calif., assignor to Southwest Welding and Manufacturing Co., Inc., Alhambra, Calif., a corporation of California Original No. 2,152,899, dated April 4, 1939, Serial No. 124,406, February 6, 1937. Application for reissue May 11, 1940, Serial No. 334,663

8 Claims. (Cl. 37—126)

This invention relates to a scraping implement such as employed in road building or other operations where the ground is to be leveled off by scraping and raising loads of dirt from the same. The invention particularly concerns a type of implement in which a scraping bowl or bucket is supported between trucks, and mounted in such a way that the elevation of the bucket with respect to the ground line, can be regulated.

The general object of the invention is to provide means for supporting the bowl, and controlling its movements in dumping the load that has been taken up by the bowl.

One of the objects of the invention is to provide a construction in which the major part of the weight of the load and frame will be carried on the rear wheels of the truck.

A type of scraper has been employed in which the dirt is collected in a bowl having a movable piston, or pusher at the back of the bowl; and in the dumping operation this pusher is moved forwardly so as to eject the load at the front end of the bowl. One of the objects of this invention is to avoid the necessity for employing a load ejector or pusher of this kind, and to construct the implement in such a way that the scraping knife or shoe maintains a relatively fixed position on the frame, regardless of the movements of the bowl ejecting the load. This facilitates leveling off the dumped earth to a substantially fixed level; at the same time, the actual height of the shoe can be adjusted between the scraping and digging position, and the dumping and leveling off position.

A further object of the invention is to improve the general construction of an implement of this type, and to provide a construction in which the bowl, and apron that cooperates with the bowl at its forward end to retain the load, are mounted between side plates of the frame, and in which the movements of the apron and the bowl are coordinated in the operations of filling the bowl and dumping a load to any desired level.

A further object is to mount the bowl so that the bowl cannot be swung back when encountering an obstruction such as a heavy rock while digging into the earth.

Further objects of the invention will appear hereinafter.

The invention consists in the novel parts and combination of parts to be described hereinafter, all of which contribute to produce an efficient carry type scraper.

A preferred embodiment of the invention is described in the following specification, while the broad scope of the invention is pointed out in the appended claims.

Figure 2:
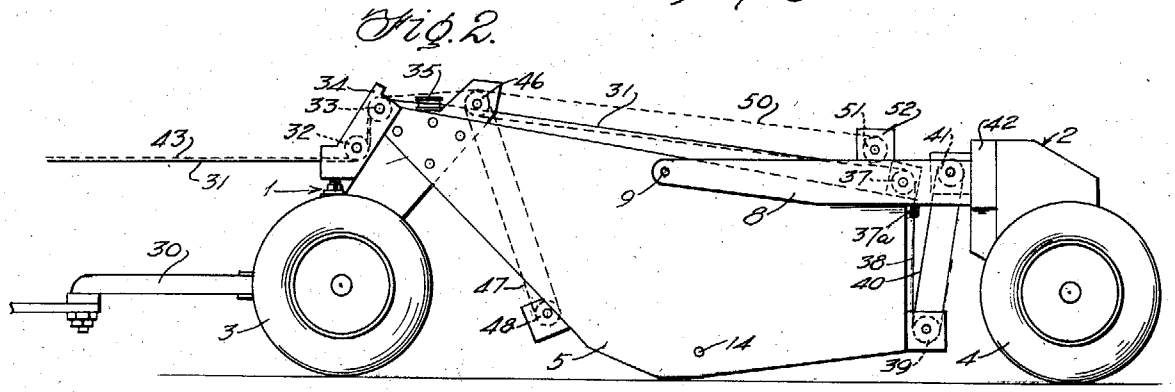
Fig. 2 is a side elevation of the implement illustrated in Fig. 1.

Referring particularly to the parts, the implement to which I have applied my invention, comprises a forward truck 1 and a rear truck 2 supported respectively on two forward wheels 3, and four rear wheels 4. The forward truck 1 is rigidly secured to two side plates 5 preferably having substantially the outline indicated in Fig. 2.

These parts constitute parts of the frame of the implement, and in accordance with the invention they are connected together in such a way as to enable the plates 5 to be raised or lowered with respect to the ground level; in other words, these parts constitute the frame of the implement, and are connected together in such a way as to enable the shoe 6 located forward of the bowl 7, to be raised or lowered at will. In order to accomplish this, the rear truck 2 is preferably provided with rigid forwardly projecting side arms 8 that extend forwardly to a point about midway between the two trucks, at which point the arms 8 are connected by pivot bolts or pins 9 to the side plates.

Rigidly secured to the side plates 5 adjacent the rear ends of the said plates 5, I provide a truss frame 10 including a transverse lower beam 11 and a transverse upper beam 12. The shoe 6 is preferably rigidly secured at its ends to the side plates 5, and preferably includes an inclined cutter plate 13 that cuts into the earth when the bowl 7 is being filled. Adjacent the shoe and preferably at its rear edge, the bowl 7 is pivotally mounted on a transverse pivot bar 14. The forward edge of the bottom plate 15 of the bowl is preferably connected to this pivot bar 14 by a piano hinge; that is to say, the forward edge of the bottom plate 15 is formed with integral sleeves 16 bent around the pivot bar 14 and alternating in position with similar sleeves 17 formed integral with the plate 13. This forms a closed hinge connection facilitating the passage of the dirt over this joint; and the sleeves 16 and 17 protect the forward edge of the bottom 15 and prevent its being bent out of position by rocks, which may be encountered in the dirt.

The rear end of the bottom plate 15 is preferably bent upwardly to form an integral dished rear head 18 for the bowl, and this head and the bottom plate 15 are preferably braced by side gusset plates 19 that form rudimentary side plates for the bowl. If desired, these gusset plates 19 may be made integral with the bottom and rear head 18.

Figure 3:
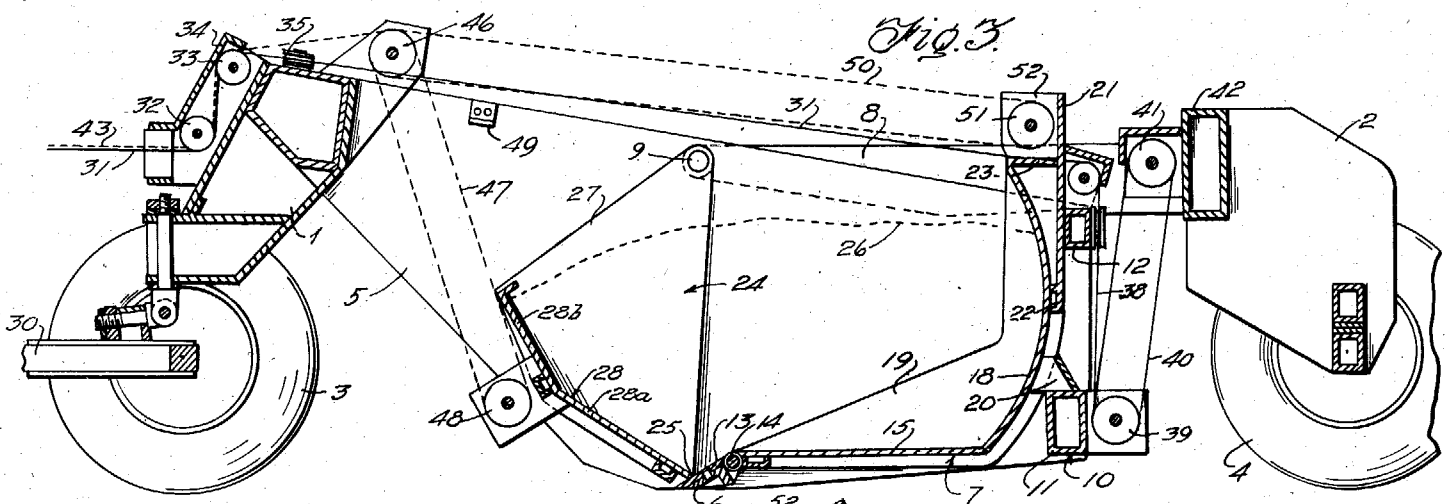
Fig. 3 is a vertical section through the implement in a front and rear direction, and illustrating the relation of the parts when the shoe and bowl are held slightly above the ground level, and showing the apron closing the forward end of the bowl, and assisting in retaining the load.

When the bowl is in the position of rest as indicated in Fig. 3, the stop bracket 20 carried by the rear end of the bowl, rests against the upper side of the lower beam 11, and this limits the downward movement of the rear end of the bowl.

The upper and rear end of the bowl may be braced by a substantially vertical brace plate 21, the lower end of which connects to a transverse channel brace 22 and the upper end of which is secured to a substantially horizontal transverse plate 23. In this way the plates 21 and 23 cooperate with the dished head 18 to form a substantially triangular box-form girder at the upper rear end of the bowl.

During a scraping operation with this implement, the shoe 6 is held at a low level so as to engage the dirt to be picked up, and the dirt passes back over the shoe into the rear end of the bowl. As this takes place an apron 24 at the forward end of the bowl is held in an elevated position; that is to say, in a partially open position so that as the dirt passes up between the lower edge 25 of the apron and the shoe 6, the dirt piling up in the bowl can gravitate in to the bowl, after which the apron would be moved to a closed position so as to retain a relatively large load as indicated by the dotted line 26. The apron is preferably pivotally supported on the pivot pins, or bolts 9, that connect the arms 8 to the side plates 5. The apron preferably includes substantially triangular side plates 27, and includes a bottom plate 28, which preferably consists of a plate bent at a slight angle so that the bottom plate presents a lower panel 28*a* having greater inclination than the upper panel 28*b* formed by this plate.

Suitable cable operated means are preferably employed for effecting the raising of the side plates 5 to regulate the elevation of the shoe 6 with respect to the ground, and for controlling the movements of the apron 24 and bowl 7. The cables can be operated from a tractor 29 to which the forward end of the implement may be coupled by means of a suitable draw bar 30 (see Fig. 1).

Figure 1:
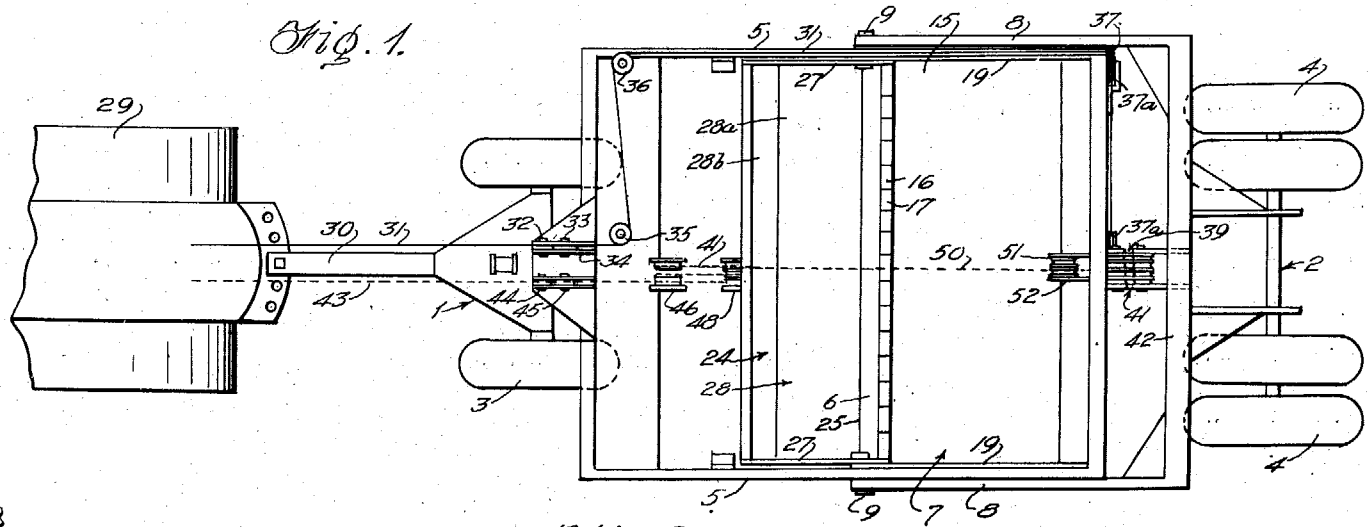
Fig. 1 is a plan of a scraping implement embodying my invention, and illustrating the same attached to the rear end of a tractor, the forward portion of the tractor being broken away.

The cable 31 indicated in full lines in Fig. 1 is that which is employed for raising and lowering the side plates 5 and shoe 6. This cable 31 passes rearwardly from the tractor and around guide sheaves 32 and 33 in a suitable housing 34 on the forward truck 1. This cable then passes rearwardly around a substantially horizontal guide sheave 35 mounted about midway of the front truck 1, then around a substantially horizontal guide sheave 36 located at one side of the truck 1. It then extends along the top of one of the side plates 5 and around a substantially vertical sheave 37 mounted on top cross beam 12 at one end thereof and then along the top of said beam and around vertically disposed sheaves 37*a*. The cable extends thence downwardly as at 38 and is then reeved in a series of falls 40 through a series of sheaves 39 and 41 mounted respectively on the lower beam 11 and a bolster 42 on the rear truck 2.

It will thus be seen that the rear end of the side plates 5 are suspended on the falls 40 of the cable extending between the blocks of sheaves 39 and 41 respectively. Since these side plates 5 are pivoted at 9 to the arms 8 which are rigid with the truck 2, a pull on the cable 31 will shorten the falls between the pulley blocks 39 and 41 and lift the rear ends of the side plates 5 and consequently the cutting blade 6 relative to the supporting trucks 1 and 2. During this movement the outer ends of the arms 8 are lifted and the wheels 3 and 4 will be brought slightly nearer together because of a slight rotation of the connected forward and rear truck frame members 1 and 2 about the axis of their respective supporting wheels. When the parts are thus lifted the scraper is in carrying position; when lowered the scraper is in digging and loading position.

Figure 4:
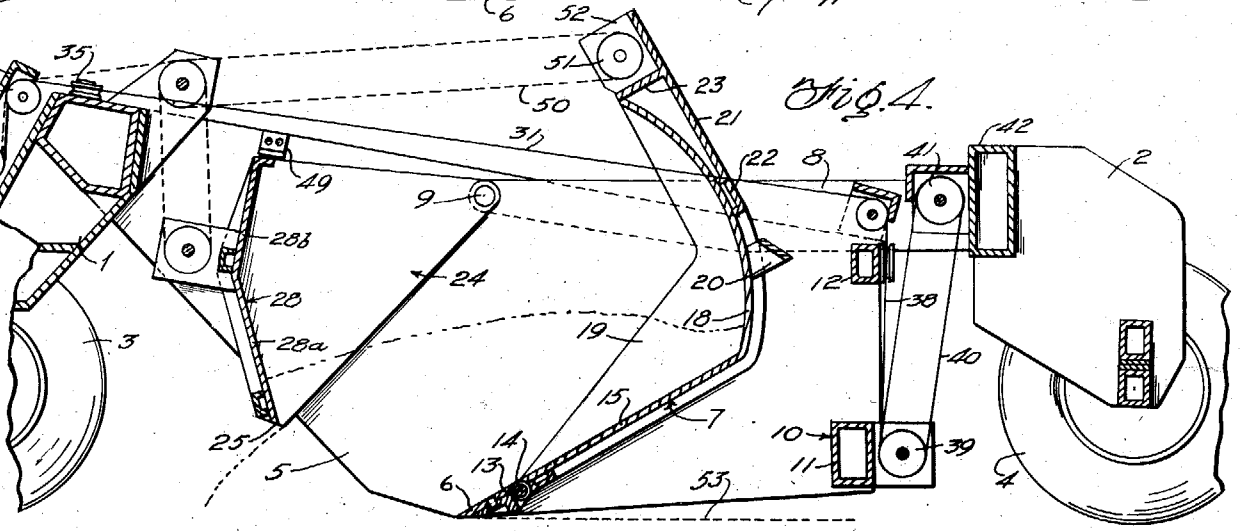
Fig. 4 is a vertical section similar to Fig. 3, but with certain parts broken away; in this view the bowl and apron are represented in the relation which they have when the load is being dumped to a level determined by the shoe.

The cable 43 for controlling the bowl 7 and the apron 24 is indicated in dotted lines in Fig. 1. This cable extends rearwardly from the tractor 29 and passes through suitable guide sheaves 44 and 45 similar to the guide sheaves 32 and 33, and from this point the cable passes rearwardly around a series of guide sheaves 46 from which the cable passes downwardly in a series of falls 47 and around a series of sheaves 48 attached to the under or forward side of the bottom plate 28 of the apron 24. When the slack of this cable is taken up, the first effect is to shorten the falls 47, thereby causing a rotation of the apron 24 on the pivot bolts 9. Eventually this will pull the apron up against stops such as the stop 49 illustrated in Fig. 3. After this takes place, slack will commence to be taken up in a horizontal run 50 extending rearwardly from the sheaves 48, and passing around a sheave 51 that is mounted in a suitable housing 52 above the plate 23 (see Fig. 3). Tension in this substantially horizontal run 50 of this cable will, of course, raise the rear end of the bowl, rotating the same on the pivot bar 14 that supports its forward edge. This relation of the bowl and apron is indicated in Fig. 4. This relation is established after the scraper bowl has been loaded with earth, and is dumping the earth. In dumping the earth the tractor 29 would pull the implement forwardly so as to permit the load to gravitate through the opening formed between the lower edge of the apron and the forward edge of the shoe. In doing this, of course, the shoe will level off the dumped earth to the grade indicated by the dotted line 53.

The forward truck 1 may be mounted on the forward axle 54 in any desired manner, but in the present instance the drawing illustrates a universal connection 55 employed for this purpose, and involving the use of an inclined pin 56 mounted on the upper side of the drawbar 30, the end of this pin being connected by an upper bend 57 to a vertical pin 58 rotatably mounted in the forward part of the forward truck 1. This vertical pin 58 corresponds to a king pin, and permits swinging of the axle 54 in a horizontal plane when the truck is turning the implement around.

It should be noted that in digging, the bowl cannot be swung rearwardly by great resistance at the shoe, as might occur from encountering a heavy rock in the earth. The shoe of the bowl is rigidly secured in the frame and the bowl is hung on the shoe.

The bowl 7 is located nearer to the rear truck than to the forward truck, and is supported on the cable falls 40 at the rear truck. The effect is to support most of the weight of the frame and load on the rear truck. This is most advantageous as it distributes most of the total load on the four rear wheels 4.

It is understood that the embodiment of the invention described herein is only one of the many embodiments this invention may take, and I do not wish to be limited in the practice of the invention, nor in the claims, to the particular embodiment set forth.

What I claim is:

1. In a scraping implement, the combination of a frame including a forward truck with wheels supporting the same, and a rear truck with wheels supporting the same, a frame supported on the trucks and including side plates, a transverse shoe secured between said side plates, a bowl pivotally mounted to swing up and down on an axis adjacent the shoe, a pivotally supported apron cooperating with the bowl to retain its load, and means operating when actuated, to swing the apron forwardly and upwardly first, and then to swing the bowl upwardly about its axis at the shoe, for dumping the load.

2. In a scraping implement, the combination of a frame including a forward truck with wheels supporting the same, and a rear truck with wheels supporting the same, a frame supported on the trucks and including side plates, a transverse shoe secured between said side plates, a bowl pivotally mounted to swing up and down on an axis adjacent the shoe, a pivotally supported apron cooperating with the bowl to retain the load, a stop for limiting the upward swinging movement of the apron, and means operating when actuated, to swing the apron forwardly and upwardly first until the same is arrested in its movement by the said stop, and operating thereafter to swing the bowl upwardly about its axis at the shoe, for dumping the load.

3. In a scraping implement, the combination of a frame including a forward truck with wheels supporting the same, a rear truck with wheels supporting the same, side plates rigid with the forward truck, arms rigid with the rear truck and pivotally attached to the side plates, a transverse shoe secured rigidly to said side plates, a bowl pivotally mounted to swing up and down on an axis adjacent the shoe, a pivotally supported apron cooperating with the forward end of the bowl to retain its load, and means including cables for first swinging the apron forwardly and upwardly, and then swinging the bowl about its axis at the shoe and thereby raising the rear end of the bowl to dump the load.

4. In a scraping implement, the combination of a frame including a forward truck with wheels supporting the same, a rear truck with wheels supporting the same, side plates rigid with the forward truck, arms rigid with the rear truck and pivotally attached to the side plates, a transverse shoe secured between said side plates, a bowl pivotally mounted to swing up and down on an axis adjacent the shoe, a pivotally supported apron cooperating with the forward end of the bowl to retain its load, means including cables for first swinging the apron forwardly and upwardly and then raising the rear end of the bowl, and means including cables for raising the rear ends of the side plates, to lift the shoe above the ground level when dumping the load.

5. In a scraper, the combination of forward and rear wheel supports, a frame on said supports including side plates, a transverse scraper blade secured between said side plates, a bowl pivoted to swing up and down on an axis adjacent said blade, a pivotally supported apron cooperating with the bowl to retain its load, and means operating when actuated to swing the apron forwardly and upwardly first, and then to swing the bowl upwardly about its axis adjacent said scraper blade for dumping the load.

6. In a scraper, the combination of forward and rear wheel supports, a frame on said supports including side plates, a transverse scraper blade secured between said side plates, a bowl pivoted to swing up and down on an axis adjacent said blade, a pivotally supported apron cooperating with the bowl to return its load, and means operating when actuated to swing the apron forwardly and upwardly first, and then to swing the bowl upwardly about its axis adjacent said scraper blade for dumping the load, said operating means including a cable and pulleys operatively associated with said frame, said bowl and said apron.

7. In a scraping implement, the combination of a frame including a forward truck with wheels for supporting the same, and a rear truck with wheels for supporting the same, a frame including side plates supported on said trucks, a transverse shoe secured between said side plates, a bowl pivotally mounted to swing up and down on an axis adjacent the shoe, an apron pivotally supported to swing on an axis between said side plates and cooperating with the bowl and the shoe to retain the load, sheaves supported by the frame and located adjacent the forward truck, a sheave attached to the apron, a cable passing over the first-named sheaves and having a fall extending down and around the sheave on the apron and thence extending rearwardly to an operative connection with the rear end of the bowl, a stop for limiting the upward swinging movement of the apron, said cable operating when the apron and bowl are in a position to carry the load, to take up the said fall first, and thereby raise the apron until it strikes the said stop, and operating thereafter to raise the rear end of the bowl, and thereby effect the dumping of the truck.

8. In a scraping implement, the combination of a frame including a forward truck with wheels for supporting the same, and a rear truck with wheels for supporting the same, a frame including side plates supported on said trucks, a transverse shoe secured between said side plates, a bowl pivotally mounted to swing up and down on an axis adjacent the shoe, an apron pivotally supported to swing on an axis between said side plates and cooperating with the bowl and the shoe to retain the load, sheaves supported by the frame and located adjacent the forward truck, a sheave attached to the apron, a cable passing over the first-named sheaves and having a fall extending down and around the sheave on the apron and thence extending rearwardly to an operative connection with the rear end of the bowl, a stop for limiting the upward swinging movement of the apron, said parts cooperating to enable the cable to hold the apron in a more or less raised position while the implement is loading the bowl, the paying out of the said cable thereafter operating to permit the apron to descend to close the forward end of the bowl for carrying the load.

EARL B. MALOON.